United States Patent [19]

Matsumoto et al.

[11] Patent Number: 5,049,983
[45] Date of Patent: Sep. 17, 1991

[54] DIGITAL CAMERA APPARATUS HAVING AN ANALOG EMPHASIS CIRCUITRY

[75] Inventors: Hiroaki Matsumoto, Chiba; Tokuya Fukuda, Tokyo; Tetsuya Senda, Kanagawa, all of Japan

[73] Assignee: Sony Corporation, Tokyo, Japan

[21] Appl. No.: 593,964

[22] Filed: Oct. 9, 1990

[30] Foreign Application Priority Data

Oct. 19, 1989 [JP] Japan .................. 1-272340

[51] Int. Cl.$^5$ .................. H04N 9/083; H04N 9/68
[52] U.S. Cl. .................. 358/44; 358/47
[58] Field of Search .................. 358/41, 44, 47, 36

[56] References Cited

U.S. PATENT DOCUMENTS

| 4,829,369 | 5/1989 | Nakagaki | 358/47 |
| 4,833,527 | 5/1989 | Kondo | 358/44 |
| 4,845,548 | 7/1989 | Kohno | 358/44 |
| 4,974,066 | 11/1990 | Tusji | 358/47 |

Primary Examiner—Howard W. Britton
Attorney, Agent, or Firm—Lewis H. Eslinger; Jay H. Maioli

[57] ABSTRACT

A digital camera apparatus has an analog emphasis circuitry arranged such that when an output from a charge-coupled device (CCD) forming the imager and cooperating with a complementary color, checkered pattern filter is processed in a digital fashion, an analog carrier chrominance signal component is emphasized before being converted to a digital signal, thus making it possible to reduce adverse influence caused by quantization noise.

6 Claims, 4 Drawing Sheets

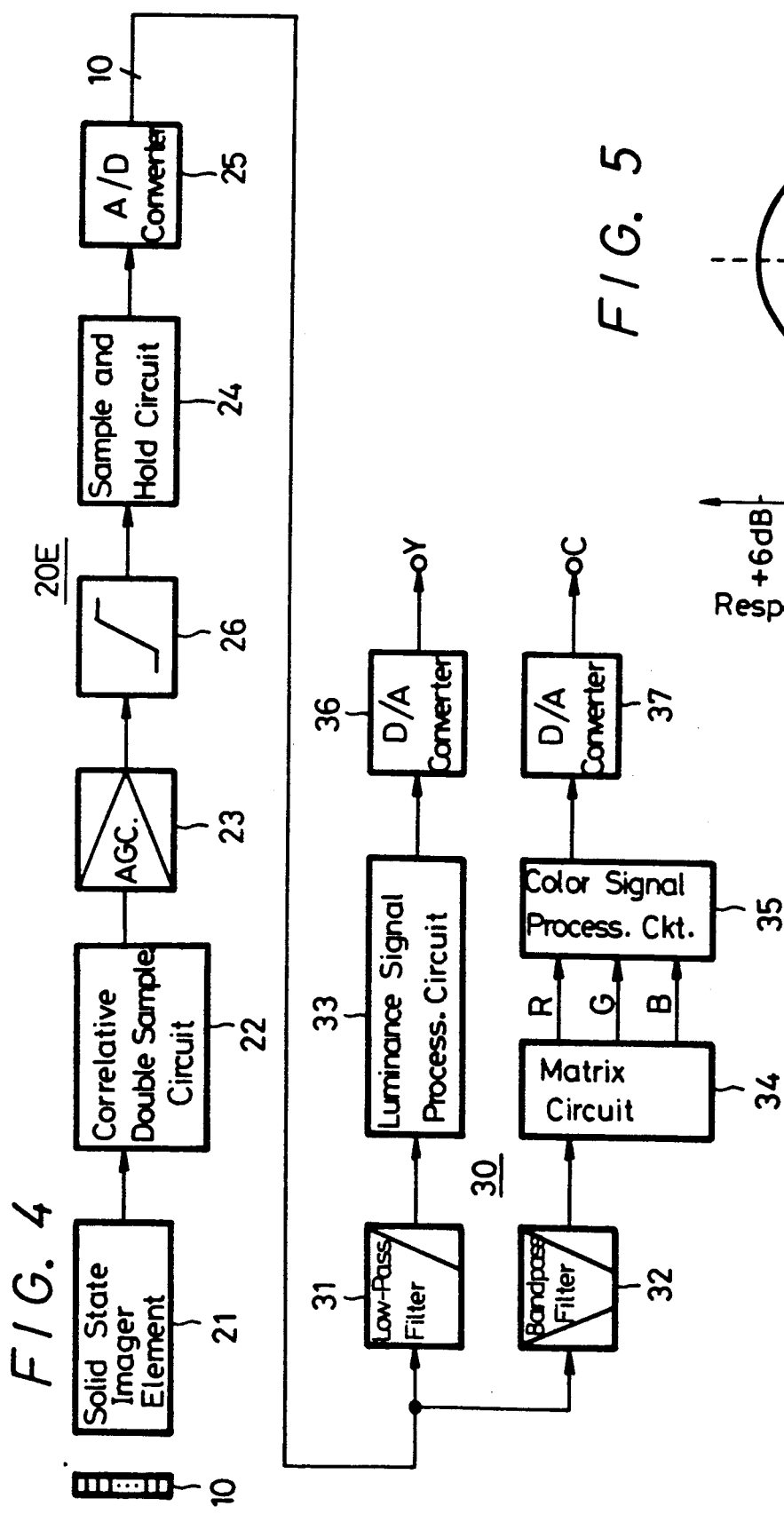

DIGITAL CAMERA APPARATUS HAVING AN ANALOG EMPHASIS CIRCUITRY

BACKGROUND OF THE INVENTION

1. Field of the Invention

The present invention generally relates to a color solid-state imager and, more particularly, is directed to a camera that digitally processes the image signal.

2. Description of the Background

A color solid-state imager is known in which a four-color filter made-up of the three complementary colors, cyan (Cy), magenta (M), yellow (Ye), plus green (G) arranged in a checkered pattern is combined with a solid state imager element. An example of such solid-state imager is found in Japanese Patent Laid-Open Gazette No. 59-161989.

FIG. 1 shows a color filter 10 in which cyan and yellow filter elements 1c and 1y are alternately arrayed on an $n^{th}$ row, and magenta and green filter elements 1m and 1g are alternately arrayed on the (n+1) row. The rows then alternate between lines of cyan and yellow filter elements and rows of magenta and green filter elements. The pattern arrangement of the cyan and yellow filter elements in the $n^{th}$, (n+2), and (n+4) rows are the same, however, the pattern arrangements of the magenta and green filter elements in the (n+1), (n+3), and (n+5) rows are opposite in phase, that is, they are offset by one filter element every row.

In FIG. 2, a color solid-state imager system is comprised of an analog signal system, shown generally at 20, and a digital signal processing system, shown generally at 30. In the analog signal system 20, a solid-state imager element 21 is provided in an opposing relation to the color filter 10 that is formed as shown in FIG. 1. This solid-state imager element 21 includes light receiving picture elements arranged in a two-dimensional manner, that is, in an X-Y matrix form, and transfer elements for transferring signal charges of respective picture elements, for example, when imager element is a charge-coupled device (CCD). An output signal from solid-state imager element 21 is supplied through a correlative double sampling circuit 22 to an automatic gain control amplifier (AGC) 23. An output from the AGC amplifier 23 is sampled and held by a sample and hold circuit 24, and an output from sample and hold circuit 24 is supplied to an analog-to-digital (A/D) converter 25, in which it is converted into a digital signal of, for example, 10 bits.

In the digital signal processing system 30, the digital signal from A/D converter 25 is supplied to a low-pass filter 31 and to a bandpass filter 32. An output from low-pass filter 31 is supplied to a luminance signal processing circuit 33, in which it undergoes necessary signal processing, such as, aperture correction, gamma correction, and the like. On the other hand, an output of bandpass filter 32 is supplied to a matrix circuit 34, in which it is processed to provide three primary color signals, red, green, and blue (R, G, and B). The red (R), green (G), and blue (B) primary color signals are supplied to a color signal processing circuit 35, in which they undergo necessary signal processing, such as white balance adjustment, gamma correction, encoding, hue correction, and the like. In the conventional color solid-state imager, since the signal processing is performed in a digital fashion as described above, the color solid-state imager can be made compact in size and requires relatively low power.

The output from luminance signal processing circuit 33 and the output from color signal processing circuit 35 are supplied to digital-to-analog (D/A) converters 36 and 37, respectively, wherein they are converted into an analog luminance signal Y and an analog color signal C, respectively.

In the operation of the color solid-state imager described above, the light reflected from an object is spatially modulated by each of the filter elements of color filter 10 and each modulated light beam is photoelectrically converted by each respective light receiving element (not shown) of solid state imager element 21 and then sampled. In the sampling operation, a sampling frequency fsp is selected to be four times as high as the color subcarrier frequency fsc, for example, fsp may equal 14.3 MHz. Further, a repetitive frequency of the color filter 10 is selected to be about ½ of the sampling frequency fsp.

In the odd-numbered field, two rows of the light receiving picture elements corresponding to the $n^{th}$ row and the (n+1) row; the (n+2) row and the (n+3) row; and so on, of the color filter 10 are horizontally scanned at the same time to sequentially generate the photoelectric-converted outputs at every two columns. That is, the output signals are calculated at every four picture elements of two rows and two columns. In the even-numbered field, two rows of the light receiving elements corresponding to rows (n+1) and (n+2); the (n+3) and N+4) rows; and so on of the color filter 10 are horizontally scanned at the same time to sequentially generate the photoelectrically converted outputs at every two columns.

The light receiving picture elements corresponding to the cyan and magenta filter elements 1c and 1m of $n^{th}$ row and (n+1) row derive signal components (B+G) and (R+B), respectively, and the light receiving picture elements corresponding to the yellow and green filter elements 1y and 1g derive signal components (R+G) and G, respectively, as shown in FIGS. 3A and 3B.

Further, the light receiving elements corresponding to the cyan and green filter elements 1c and 1g of the (n+2) row and the (n+3) row, respectively, of color filter 10 derive signal components (B+G) and G and the light receiving picture elements corresponding to the yellow and magenta filter elements 1y and 1m color filter 10 derive signal components (R+G) and (R+B), respectively, as shown in FIGS. 3C and 3D.

In the horizontal scanning of the odd-numbered and even-numbered fields, a total sum Ss of the output signals generated at every 4 picture elements of 2 rows and 2 columns is expressed as: $Ss = (2R + 3G + 2B)$. Thereafter, the signal is processed by low-pass filter 31 and the resultant signal is a luminance signal that is uniform and compensates any lens distortion.

If a sum of the output signals of each of the columns is calculated at every four picture elements of two rows and two columns on the $n^{th}$ row and the (n+1) row in the odd-numbered field and a difference between the sum signals of each of the columns is calculated, then a differential signal Sdb is expressed as:

$$Sdb = [(B+G)+(R+B)]31 [(R+G)+G] = 2B - G$$

Similarly, if a sum of output signals of each of the columns is calculated at every four picture elements of two rows and two columns on the (n+2) row and the (n+3) row and a difference between the sum signals of each of the columns is calculated, then a differential signal Sdr is expressed as:

$$Sdr = [(B+G)+G] - [(R+G)+(R+B)] = -(2R-G)$$

Further, the same differential signals Sdb and Sdr are obtained on the (n+1) row, the (n+2) row, the (n+3) row and (n+4) row of the even-numbered field.

The differential signals, Sbd and Sdr, are subcarrier chrominance signal components that are formed on the basis of the spatial modulation performed by the respective filter elements of color filter 10. The repetitive frequencies thereof become one half of the sampling frequency fsp, that is, twice as high as the color subcarrier frequency fsc, for example, fsp may equal 7.16 MHz.

Nevertheless, in the previously proposed color solid-state imager the level of the analog carrier chrominance signal component delivered from the AGC amplifier 23 is decreased, for example, to ¼ to ½ of the level of the luminance signal component, so that when the analog signal is digitally converted by the A/D converter, even according to the linear quantization process, the accuracy of the carrier chrominance signal is about 8 to 9 bits for the standard input level equivalent, which is, for example, 10 bits.

Further, when a dynamic range that is three times as wide as the standard input level is maintained by the gamma correction circuit, the high-level region is compressed, so that with the standard input level the accuracy of the carrier chrominance signal component is decreased to about 6 to 7 bits.

As a result, fine gradation of the color signal cannot be obtained and a so-called false contour occurs in the reproduced picture, in which there are step changes in the brightness of certain colors in place of the desired gradual change in brightness. Furthermore, a satisfactory signal-to-noise (S/N) ratio cannot be obtained due to the quantization noise produced by the analog-to-digital conversion.

OBJECTS AND SUMMARY OF THE INVENTION

Accordingly, it is an object of the present invention to provide an improved digital camera apparatus having analog emphasis circuitry in which the aforenoted shortcomings and disadvantages of previously proposed systems can be eliminated.

It is another object of the present invention to provide a digital camera apparatus having analog emphasis circuitry, in which the quality of the reproduced picture can be prevented from deteriorating due to quantization noise.

It is a further object of the present invention to provide a digital camera apparatus having analog emphasis circuitry, in which the occurrence of a so-called false contour can be reduced.

According to an aspect of the present invention, a digital camera apparatus having analog emphasis circuitry includes a color filter in which one primary color filter element and three complementary color filter elements are arranged in a checkered pattern, and a solid-state imager in which light receiving picture elements are arranged in a two-dimensional manner, wherein the filter elements and the light receiving picture elements are opposed to each other. The imager produces an analog luminance signal component and an analog carrier chrominance signal component, each of which results from horizontally scanning two rows of the light receiving picture elements simultaneously. These signal components are processed by a processing circuit in a digital fashion. This digital camera apparatus is further characterized by an emphasizing circuit for emphasizing the carrier chrominance signal component.

The above and other objects, features, and advantages of the present invention will become apparent from the following detailed description of a preferred embodiment when read in conjunction with the accompanying drawings, in which like reference numerals are used to identify the same or similar parts in the several views.

BRIEF DESCRIPTION OF THE DRAWINGS

FIG. 4 is a schematic in block diagram form of a digital camera apparatus having analog emphasis circuitry according to an embodiment of the present invention; and FIG. 5 is a graphical representation of the characteristics of a main portion of the embodiment of FIG. 4.

DETAILED DESCRIPTION OF A PREFERRED EMBODIMENT

Figure 1:
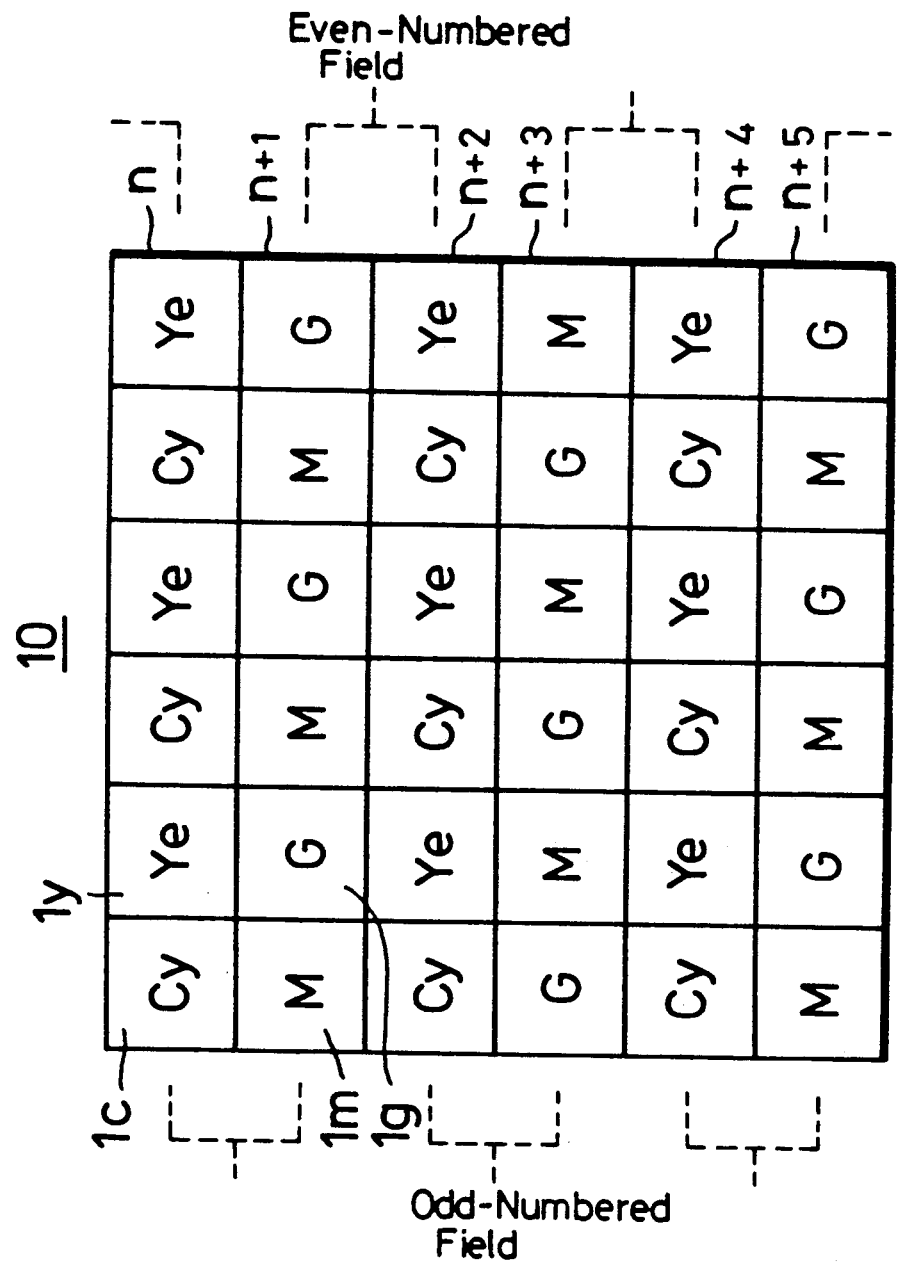
FIG. 1 is a plan view illustrating an arrangement of color filter elements used in a prior-art solid-state imager.
Figure 2:
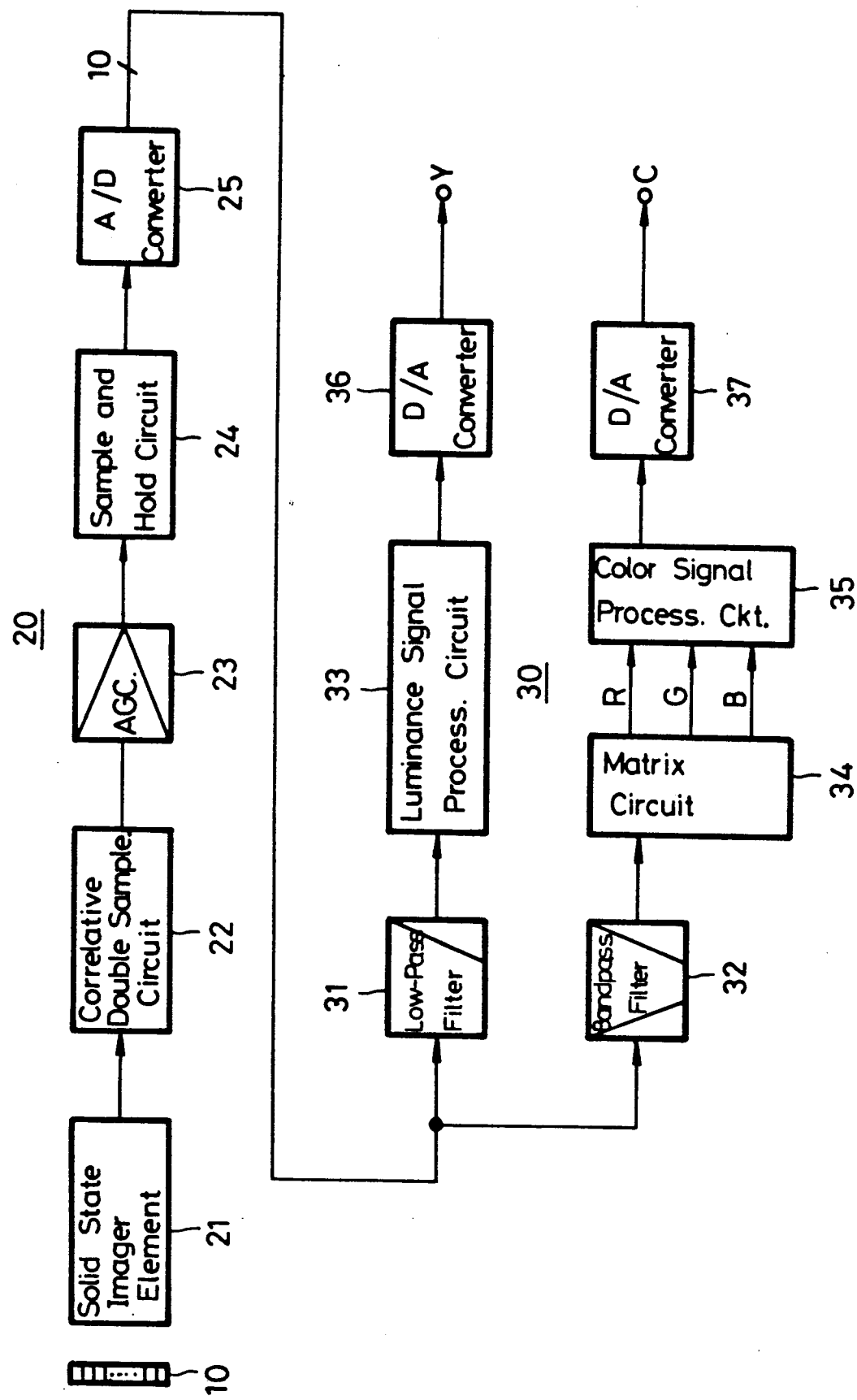
FIG. 2 is a schematic in block diagram form of a prior-art color solid-state imager.
Figure 3A:
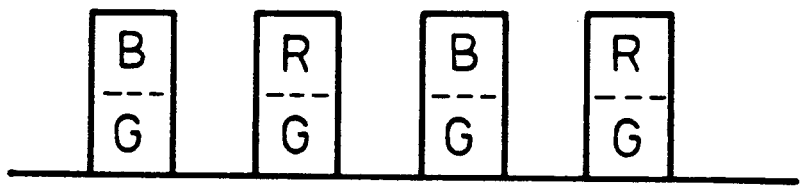
FIG. 3A to 3D are diagrammatic representations showing respective color signal components useful in explaining the operation of the color solid-state imager of FIG. 2.
Figure 3B:
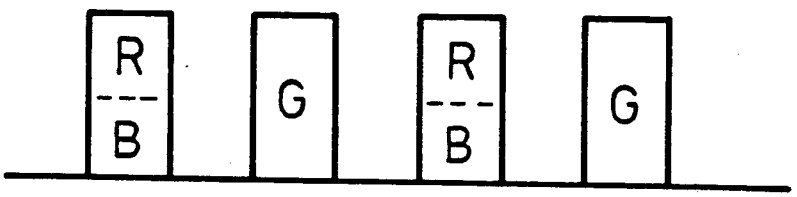
Figure 3C:
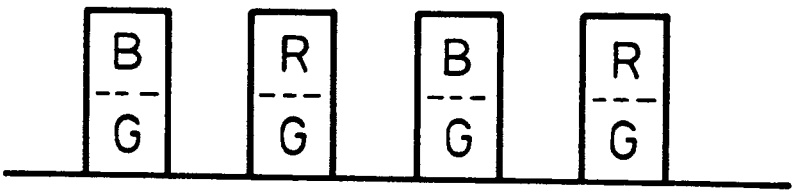
Figure 3D:
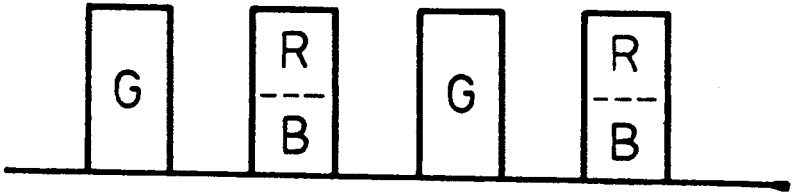

An embodiment of a digital camera apparatus having analog emphasis circuitry according to the present invention is shown in FIG. 4 in which like parts corresponding to those of FIG. 2 are identified with the same reference numerals and are not described again in detail.

Referring to FIG. 4, in an analog signal system, shown generally at 20E, an emphasizing circuit 26 is connected between AGC amplifier 23 and sample and hold circuit 24 and various constants of the matrix circuit 34 are varied accordingly, specifically, the gain constants are varied for de-emphasis. The remainder of the circuit arrangement of FIG. 4 is the same as that of FIG. 2.

The emphasizing circuit 26 in this embodiment increases, or emphasizes, the level of the analog carrier chrominance signal by, for example, 6 dB near a frequency corresponding to one half the sampling frequency fsp, that is, near a frequency that is twice as high as the color subcarrier frequency fsc on the basis of the low frequency and the sampling frequency, as shown by the frequency characteristic response curve of FIG. 5.

Thus, the accuracy of the digital carrier chrominance signal component delivered from A/D converter 25 is increased by, for example, 1 bit, whereby fine gradation of color difference signals can be maintained, the influence of quantization noise can be reduced, and the occurrence of false contour as described hereinbefore can be reduced.

As set out above in detail according to the present invention, because the emphasizing circuit emphasizes the analog carrier chrominance signal component that results from simultaneously horizontally scanning the light receiving elements of two adjacent rows of the solid-state imager opposing the complementary color checkered pattern filter, it is possible to provide a digital camera in which the quality of the resultant pictures will not be deteriorated due to the quantization of the color signal.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

WHAT IS CLAIMED IS

1. A digital camera apparatus comprising:
   a color filter assembly in which one primary color filter element and three complementary color filter elements are arranged in a plurality of rows and columns in a checkered pattern;
   a solid-state imager element having light receiving picture elements arranged in a two-dimensional array, wherein said primary and complementary color filter elements and said light receiving picture elements are opposed to each other, and from which an analog luminance signal component and an analog carrier chrominance signal component are produced upon horizontally scanning two rows of said light receiving picture elements simultaneously;
   an emphasizing circuit for emphasizing said carrier chrominance signal component; and
   processing means for digitally processing said analog luminance signal component and said emphasized carrier chrominance signal component for producing a digital luminance signal and a digital chrominance signal.

2. The apparatus according to claim 1, wherein said carrier chrominance signal component processing circuit includes a color matrix circuit.

3. The apparatus according to claim 1, wherein said emphasizing circuit emphasizes the level of a frequency component of said carrier chrominance signal component near a repetitive frequency of said color filter assembly.

4. The apparatus according to claim 1, wherein a horizontal scanning output from said light receiving picture elements is supplied through an automatic gain control circuit and a sample and hold circuit to an analog-to-digital converter, and said emphasizing circuit is connected between and automatic gain control circuit and said sample and hold circuit.

5. The apparatus according to claim 4, wherein an output from said analog-to-digital converter is separated into a luminance signal component and a carrier chrominance signal component by a filter circuit.

6. The apparatus according to claim 4, wherein a repetitive frequency of said color filter assembly is selected to be one-half the value of a sampling frequency of said sample and hold circuit.

* * * * *